(12) United States Patent
Sukenari et al.

(10) Patent No.: US 7,708,238 B2
(45) Date of Patent: May 4, 2010

(54) VISUAL PRESENTER

(75) Inventors: Kazuhiro Sukenari, Nagoya (JP); Yoshihiko Araya, Kariya (JP)

(73) Assignee: Elmo Co., Ltd., Aichi (JP)

( * ) Notice: Subject to any disclaimer, the term of this patent is extended or adjusted under 35 U.S.C. 154(b) by 940 days.

(21) Appl. No.: 11/484,794

(22) Filed: Jul. 11, 2006

(65) Prior Publication Data

US 2007/0146654 A1 Jun. 28, 2007

(30) Foreign Application Priority Data

Dec. 27, 2005 (JP) ............................. 2005-374610

(51) Int. Cl.
| | |
|---|---|
| *A47F 5/00* | (2006.01) |
| *A47F 7/00* | (2006.01) |
| *F16M 11/00* | (2006.01) |
| *F16M 13/00* | (2006.01) |
| *G03B 15/00* | (2006.01) |
| *G03B 17/00* | (2006.01) |

(52) U.S. Cl. ..................... 248/123.2; 396/5; 396/428
(58) Field of Classification Search ............... 248/590, 248/123.11, 123.2, 162.1, 280.11; 396/5, 396/419, 428; 348/63

See application file for complete search history.

(56) References Cited

U.S. PATENT DOCUMENTS

| 5,092,552 | A | * | 3/1992 | Dayton et al. | .......... 248/280.11 |
| 5,933,191 | A | * | 8/1999 | Ariga et al. | ................. 348/373 |
| 6,867,962 | B2 | * | 3/2005 | Cho et al. | .............. 361/679.27 |
| 7,394,978 | B2 | * | 7/2008 | Sukenari et al. | ............. 396/155 |
| 2004/0233325 | A1 | * | 11/2004 | Lee et al. | ..................... 348/375 |
| 2005/0205735 | A1 | * | 9/2005 | Ichikawa et al. | ....... 248/292.12 |

FOREIGN PATENT DOCUMENTS

JP           10-191105           7/1998

\* cited by examiner

*Primary Examiner*—Georgia Y Epps
*Assistant Examiner*—Ryan Howard
(74) *Attorney, Agent, or Firm*—William L. Androlia; H. Henry Koda (57) ABSTRACT

A visual presenter includes a base having a pivot shaft unit including a shaft support bracket, a support column mounted on the pivot shaft unit so as to be pivotable between a standing position and a forwardly-inclined position, a pivot shaft supported on the bracket, a wave washer inserted through the shaft to be tightened against the bracket by a nut in threading engagement with the shaft, and a return spring attached to the shaft so as to apply a biasing force to the shaft. The braking force and the biasing force counteract a pivotal movement of the support column, and the base includes a counterweight disposed in the base so that the base is prevented from being moved during an operation of pivoting the support column.

3 Claims, 9 Drawing Sheets

VISUAL PRESENTER

CROSS-REFERENCE TO RELATED APPLICATIONS

This application is based upon and claims the benefit of priority from the prior Japanese Patent Application No. 2005-374610, filed on Dec. 27, 2005, the entire contents of which are incorporated herein by reference.

BACKGROUND OF THE INVENTION

1. Field of the Invention

The present invention relates to a visual presenter which displays on a monitor, screen or the like a captured image of material.

2. Description of the Related Art

Conventional small visual presenters include a base on which a pivot shaft is mounted. A support column is pivotally mounted on the pivot shaft. The support column has a distal end to which an imaging camera is mounted. A disc spring or wave washer is attached to the pivot shaft to apply a braking force to the pivot shaft so that the support column is prevented from being inclined forward. JP-A-H10-191105 discloses one of the aforesaid conventional visual presenters.

However, when the support column is inclined forward or caused to stand, a user needs to move the support column with one of his or her hands while holding the base of the visual presenter with his or her other hand. When the user tries to move the support column with his or her hand without holding the base, the base is moved together with the support column, resulting in inconvenience.

SUMMARY OF THE INVENTION

Therefore, an object of the present invention is to provide a visual presenter which has such a good operability that the support column on which the imaging camera is mounted can be moved with user's one hand.

The present invention provides a visual presenter comprising a visual presenter comprising, a stage on which material is placed, a base which is discrete from the stage and is provided with a pivot shaft unit including a shaft support bracket, a support column mounted on the pivot shaft unit so as to be pivotable between a standing position and a forwardly-inclined position, a pivot shaft supported on the shaft support bracket, a wave washer inserted through the pivot shaft to be tightened against the shaft support bracket by a nut in threading engagement with the pivot shaft, whereby a braking force is applied to the pivot shaft, and a return spring attached to pivot shaft so as to apply a biasing force to the pivot shaft, the biasing force having a direction in which the support column is returned from the forwardly-inclined position to the standing position. In the visual presenter, the braking force and the biasing force counteract a pivotal movement of the support column, and the base includes a counterweight disposed in the base so that the base is prevented from being moved during an operation of pivoting the support column.

According to the above-described visual presenter, the pivot shaft unit is subjected to both braking force of the wave washer and biasing force of the return spring. Since both forces counteract the pivotal movement of the support column, the support column can be stopped at any forward inclination, whereupon a free stop mechanism is provided. Furthermore, when returned from the forwardly-inclined position to the standing position, the support column can easily be raised with the assist of the biasing force of the return spring. Additionally, since the counterweight is enclosed in the base, when the support column is forwardly inclined, the rear side of the visual presenter is prevented from being raised without the user holding the base of the visual presenter. Accordingly, one-hand operation of the support column can be realized.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
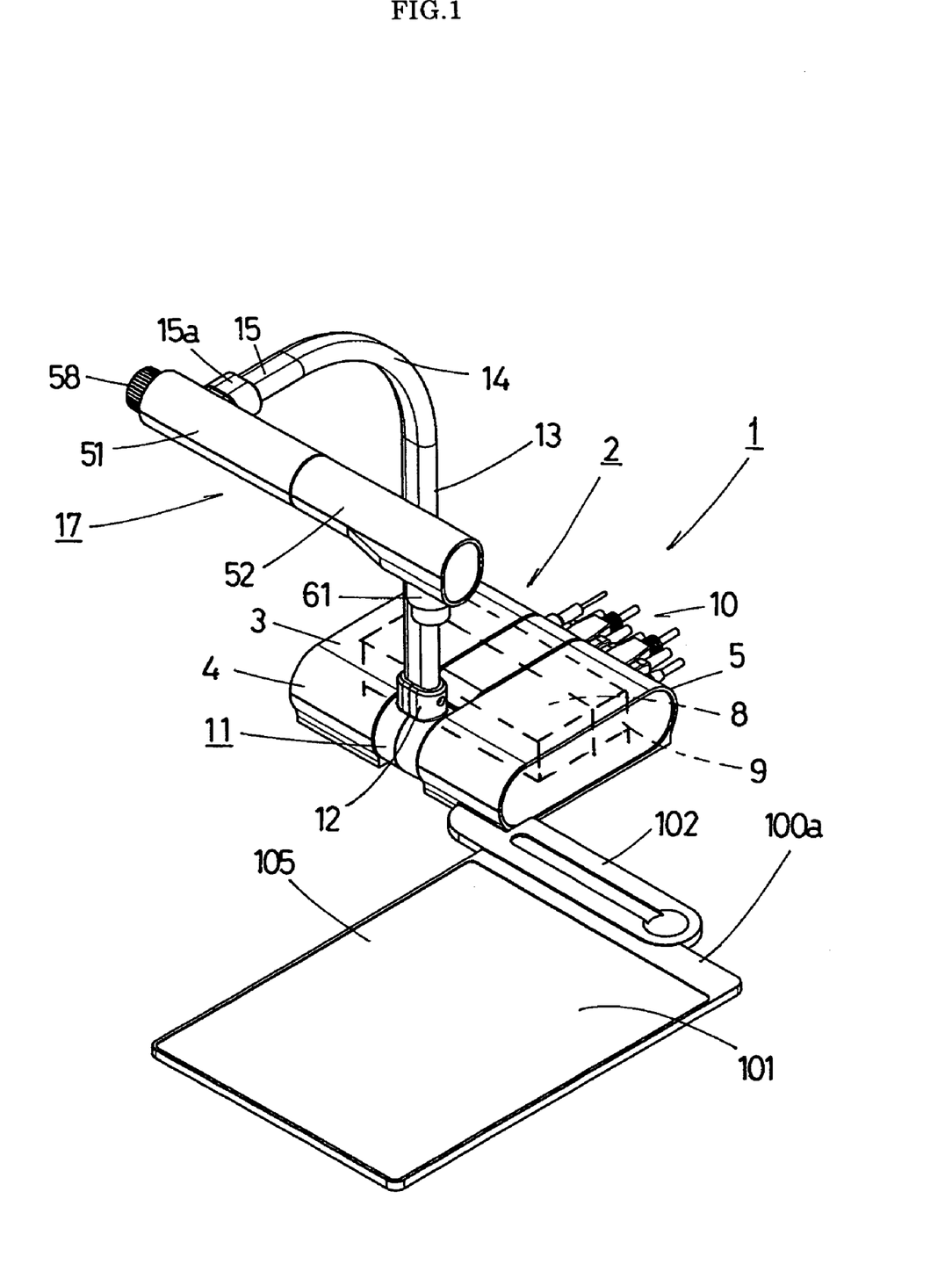
FIG. 1 is a perspective view of a visual presenter in accordance with one embodiment of the present invention.
Figure 11:
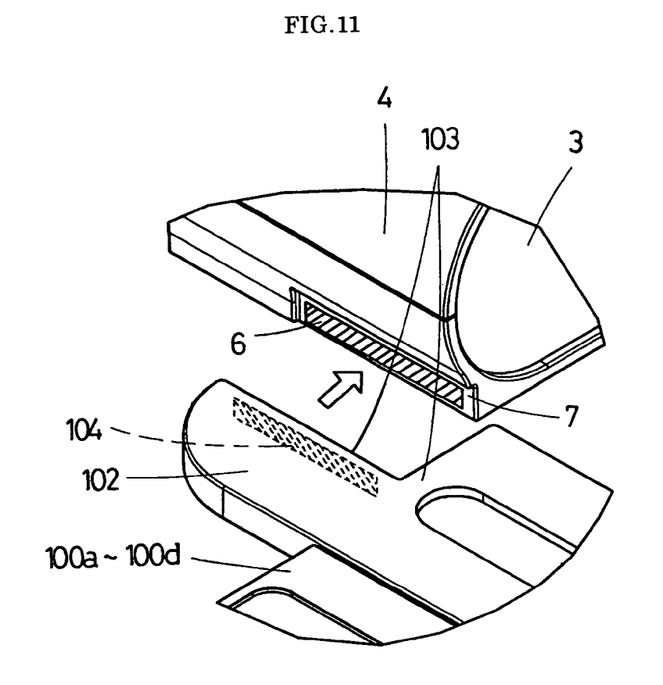
FIG. 11 is a perspective view of a positioner and a positioned member.

One embodiment of the present invention will be described with reference to the accompanying drawings. Referring to FIG. 1, a visual presenter 1 of the embodiment is shown. The visual presenter 1 comprises a body 2 and a stage 100a coupled to the body 2. The body 2 includes a base 3, a support column 13 and an imaging camera 17. The base 3 is formed into a rectangular shape and has a front 4 and a rear 5 both of which have curved faces. A positioner 7 is formed in a corner of a lower edge of the front 4 as shown in FIG. 11. The positioner 7 includes a magnet piece 6 affixed thereto.

A control circuit unit 8 and a weight 9 are enclosed in the base 3. The weight 9 prevents the rear 5 side of the base 3 from rising when the support column 13 is inclined front ward. Furthermore, various connecting sockets 10 and the like are provided on the rear 5 of the base 3 for ensuring electrical connection between external equipment and the visual presenter 1. A pivot shaft 11 is pivotally mounted on substantially a central part of the curved surface 4 side of the base 3. The pivot shaft 11 has an upper surface on which a support column mounting portion 12 is formed.

The support column 13 is inserted into the mounting portion 12 so as to stand. The support column 13 is hollow and accordingly, wire harness (not shown) is inserted through the support column 13. A curved portion 14 is formed on the support column 13. The curved portion 14 has a distal end on which a horizontal portion 15 protruding in such a direction that the horizontal portion 15 is spaced away from the front 4 of the base 3. Furthermore, the horizontal portion 15 has a distal end on which a coupling part 15a is mounted. The coupling part 15*a* also has a distal end on which a hollow pivot shaft 16 formed. An imaging camera 17 is pivotally mounted on the hollow pivot shaft 16.

Figure 2:
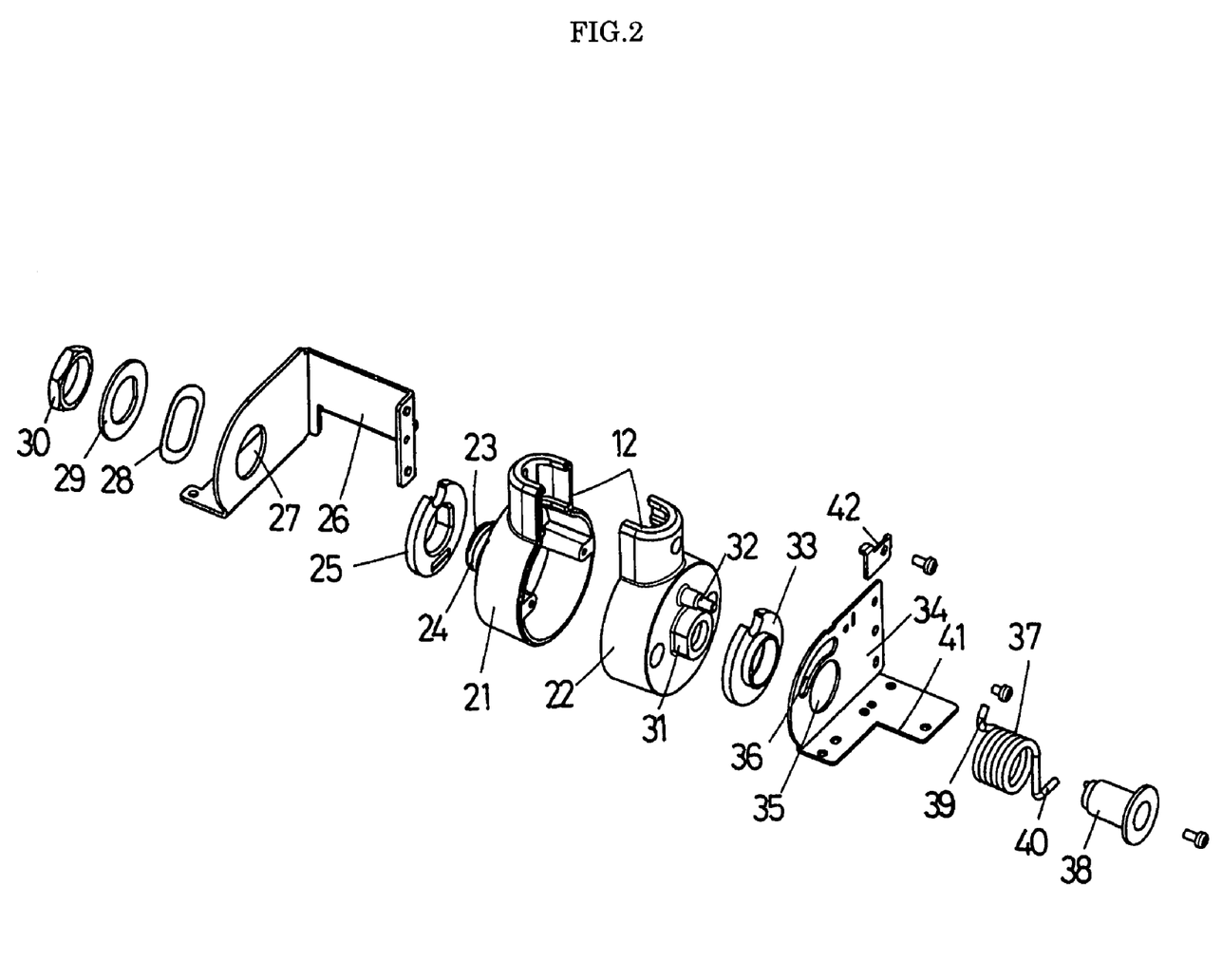
FIG. 2 is an exploded perspective view of a pivot shaft.
Figure 3:
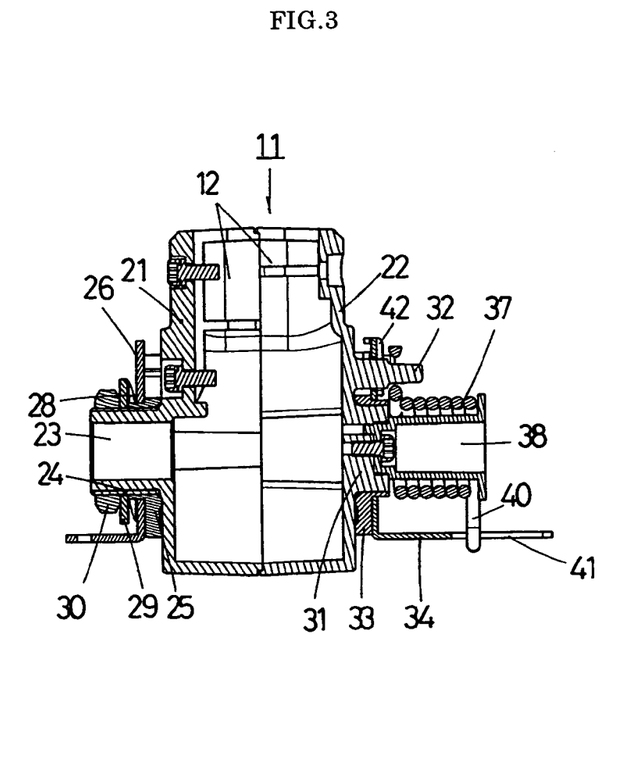
FIG. 3 is a sectional view of the pivot shaft.
Figure 4:
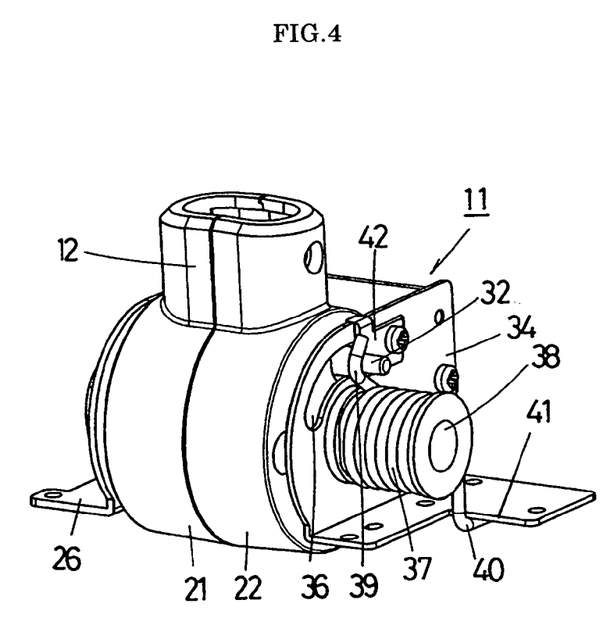
FIG. 4 is a perspective view of the pivot shaft.

Referring now to FIGS. 2 to 4, the pivot shaft 11 includes two left and right members 21 and 22 integrated together. The members 21 and 22 are made from aluminum by die-casting. The left member 21 is formed with a hollow shaft 23. The hollow shaft 23 has a distal end on which a male screw 24 is formed. The hollow shaft 23 is inserted through a operation unit hole 27 of the bracket 26 fixed in the base 3 with a spacer 25 being fitted on the male thread 24. A wave washer 28 and a flat washer 29 are fitted on a part of the hollow shaft protruding from the shaft support hole 27. The wave washer 28 and a flat washer 29 are tightened up against the bracket 26 by a nut 30.

A right-hand member 22 includes a shaft 31 and a spring-holding pin 32 both formed on a right sidewall thereof, as shown in FIG. 2. The shaft 31 is inserted through a shaft hole 35 of a bracket 34 fixed in the base 3 with a spacer 33 being interposed therebetween. The spring-holding pin 32 is inserted through an arc hole 36 formed in the bracket 34 so as to be concentric with the shaft hole 35. The shaft 31 has an end to which a shaft 38 with a return spring 37 is fixed.

The return spring 37 has one end formed with a hook 39 hooked on the pin 32 and the other end also formed with a hook 40 which is hooked on a spring hook 41 of the bracket 34. The return spring 37 imparts a turning force on the support column 13 standing on the mounting portion 12 in such a direction that the support column 13 rises from a forwardly-leaning position. The bracket 34 is provided with a stopper 42 controlling the rising state of the support column 13 against which the pin 32 abuts.

Figure 5:
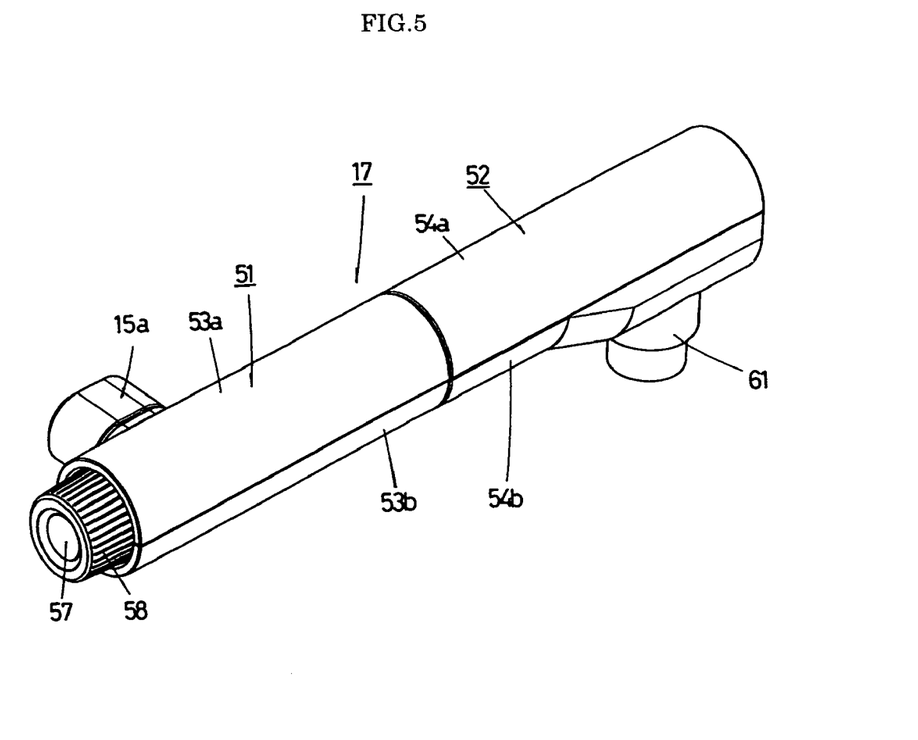
FIG. 5 is a perspective view of an imaging camera.

Referring now to FIG. 5, an imaging camera 17 comprises two parts obtained by dividing the camera at a lengthwise center thereof, that is, a slender operation unit 51 and a camera body 52. The operation unit 51 includes upper and lower two-split cylindrical cases 53*a* and 53*b* both made of a synthetic resin. The camera body 52 also includes upper and lower two-split cylindrical cases 54*a* and 54*b* both made of a synthetic resin.

A pivot shaft 16 is mounted on a distal end of the horizontal part 15 of the support column 13. The pivot shaft 16 is inserted into a hole (not shown) formed in a proximal end of the lower case 53*b*. The pivot shaft 16 is pivotally mounted on a pivot bearing 55 by a clamping piece 56 screwed to the bearing 55 provided on the case 53*b*. A slopper (not shown) is provided case 53*b* for limiting a pivoting angle of the pivot shaft 16 to 90 degrees. A detent mechanism (not shown) is provided between the case 53*b* and the pivot shaft 16 for offering a crisp feel at every 90-degree pivot. A zoom dial 58 with a centrally incorporated autofocus button is rotatably mounted on a proximal end of the case 53*b*. A coupling shaft bracket 59 is mounted on a side end opposite to the zoom dial 58.

Figure 6:
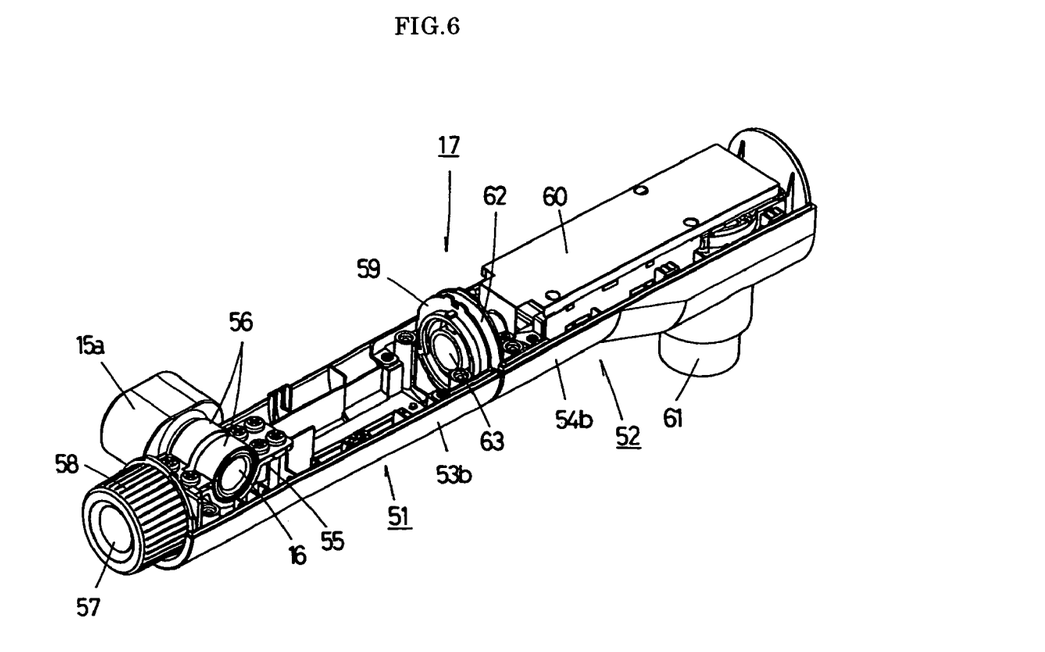
FIG. 6 is a perspective view of an interior of the imaging camera.
Figure 7:
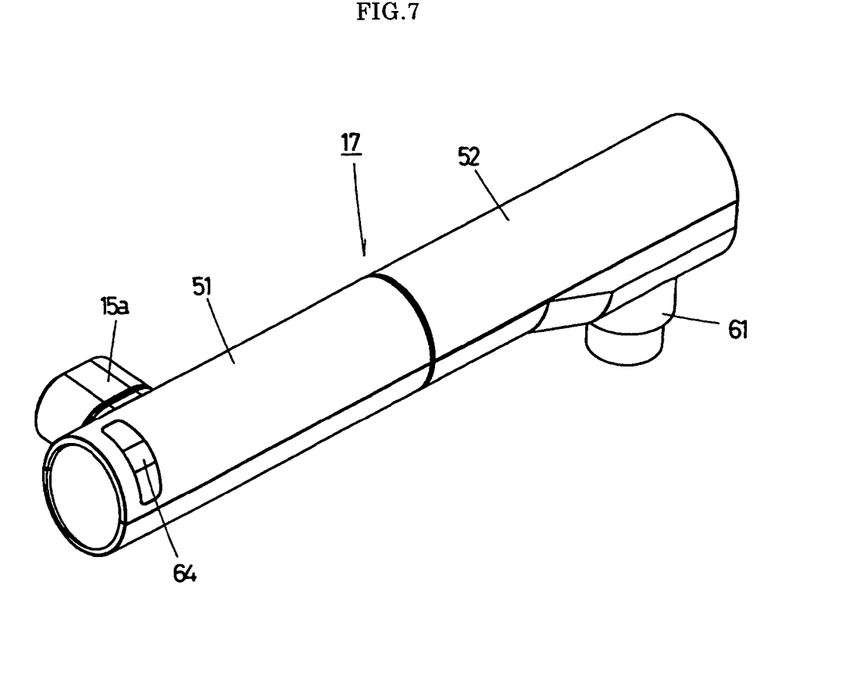
FIG. 7 is a perspective view of another example of the imaging camera.

A camera control circuit unit 60 for the imaging camera 17 is mounted on the lower case 54*b* of the camera body 52. A lens barrel 61 is formed on a lower distal end of the case 53*b* so as to protrude. A coupling shaft bracket 62 is mounted on the proximal end of the case 54*b*. A hollow coupling shaft 63 is inserted between the bracket 59 of the case 53*b* and the bracket 62 of the case 54*b*. The camera body 52 is pivotally coupled to the operation unit 51 by the coupling shaft 63. The imaging camera 17 may comprise an operation knob 64 or the like, instead of the zoom dial 58.

Figure 8:
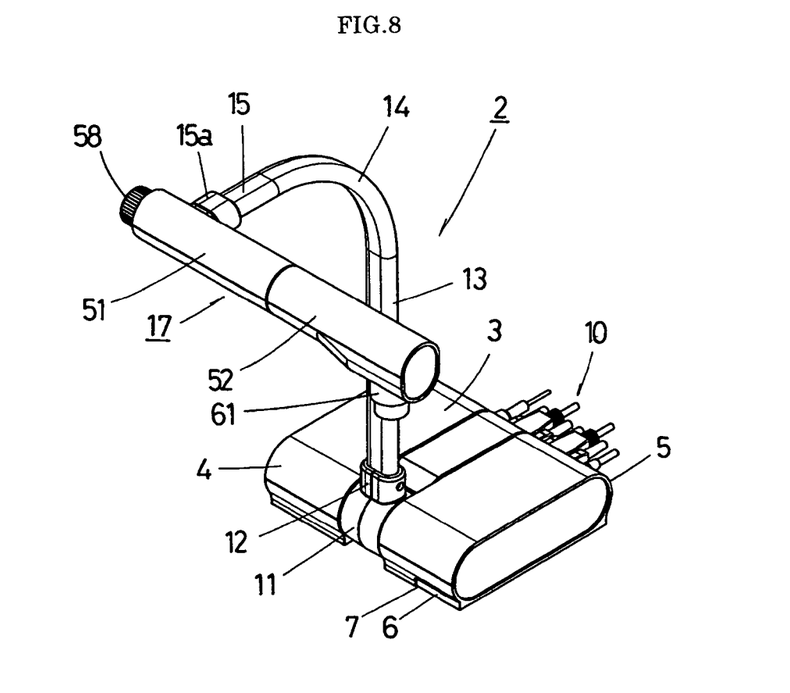
FIG. 8 is a perspective view of the body of the visual presenter when the imaging camera is in a horizontal position.
Figure 9:
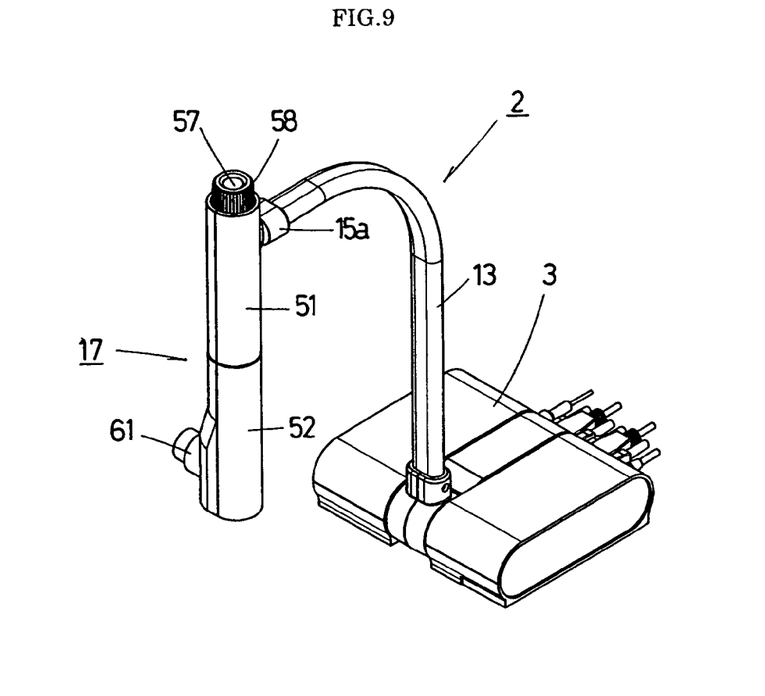
FIG. 9 is also a perspective view of the body of the visual presenter when the imaging camera is in a vertical position.
Figure 10:
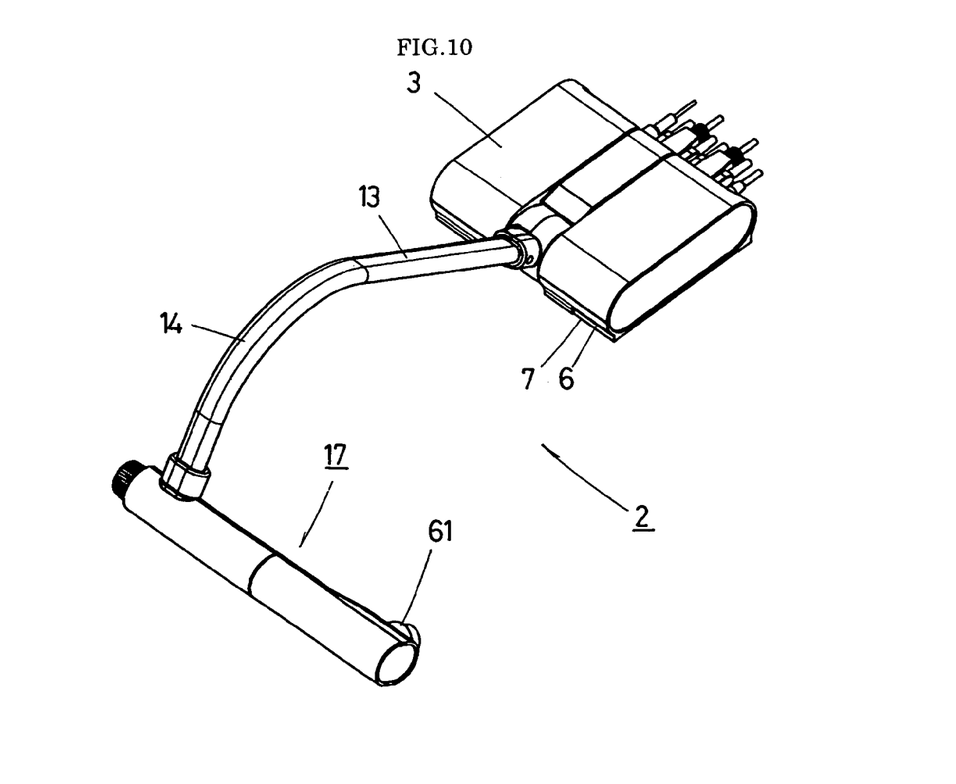
FIG. 10 is further a perspective view of the body.

The control circuit unit 8 disposed in the base 3, the camera control circuit unit 60 and the zoom dial 58 with incorporated autofocus button 57 and the like are electrically connected to one another. A wire harness ensuring the electrical connection is arranged through the hollow shaft 23 of the pivot shaft 11, the support column 13, the hollow pivot shaft 16 and the coupling shaft 63. The above-described body 2 is caused to pivot about the pivot shaft 16 of the pivot operation unit 51 of the imaging camera 17 from the steady state as shown in FIGS. 1 and 8, so that the body 2 can be changed from the horizontal state to the vertical state and to the state where the column 13 is leaned forward.

When the column 13 is leaned forward, the weight 9 disposed in the base 3 prevents the rear 5 side of the base 3 from rising. Furthermore, a nut 30 applies a braking force via the washers 28 and 29 to the pivot shaft 11 between the brackets 26 and 34. Additionally, the return spring 37 biases the shaft 31 of the pivot shaft 11 in such a direction that the forwardly leaned support column 13 rises. Accordingly, when pivoting moment of the column 13 with the imaging camera 17 mounted thereon, the clamping force of the nut 30 and a biasing force of the return spring 37 are adjusted so as to become head-to-head or substantially equal to one another, the support column 13 can be stopped at any forward lean angle, that is, a free stop mechanism can be provided. Furthermore, when the column 13 is returned from the forward leaning state to the rising state, the column 13 can easily be caused to rise with assistance of the biasing force of the return spring 37.

FIGS. 12 to 15 exemplify stages 100*a* to 100*d* coupled to the body 2 in use. Each stage has an upper surface or placement surface 101. Furthermore, each stage has a front edge formed with a positioned member 102 coupled to the positioner 7 of the base 3. The positioned member 102 is formed with a right-angled estimation portion 103 which has one side on which a magnetic piece 104 is affixed.

The aforesaid positioner 7 and the positioned member 102 are coupled together by an attractive force of the magnet. In this case, the right-angled corner of the base 3 abuts against the estimation portion 103 so that the placement surfaces 101 of the stages 100*a* to 100*d* are positioned so as to correspond to an imaging range of the imaging camera 17 in the normal state of the body 2 and so that a central part of the placement surface 101 corresponds to a central part of the imaging range of the imaging camera 17.

Figure 12:
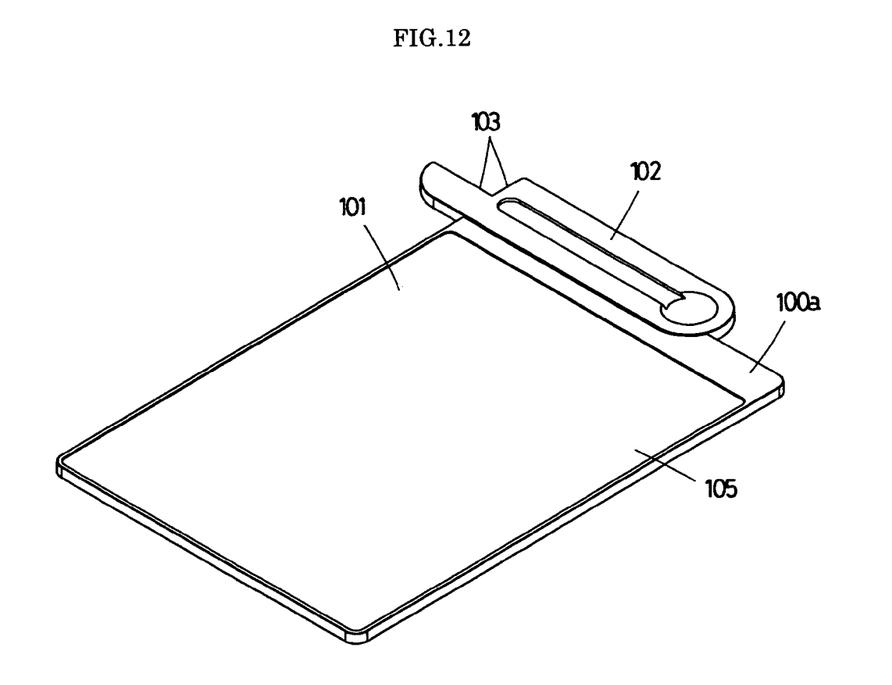
FIG. 12 is a perspective view of the stage.
Figure 13:
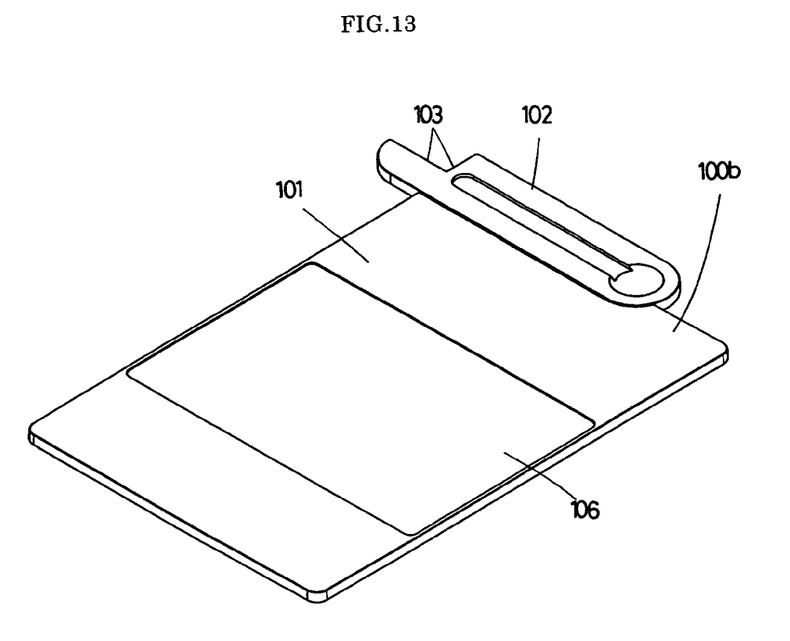
FIG. 13 is a perspective view of the stage.
Figure 14:
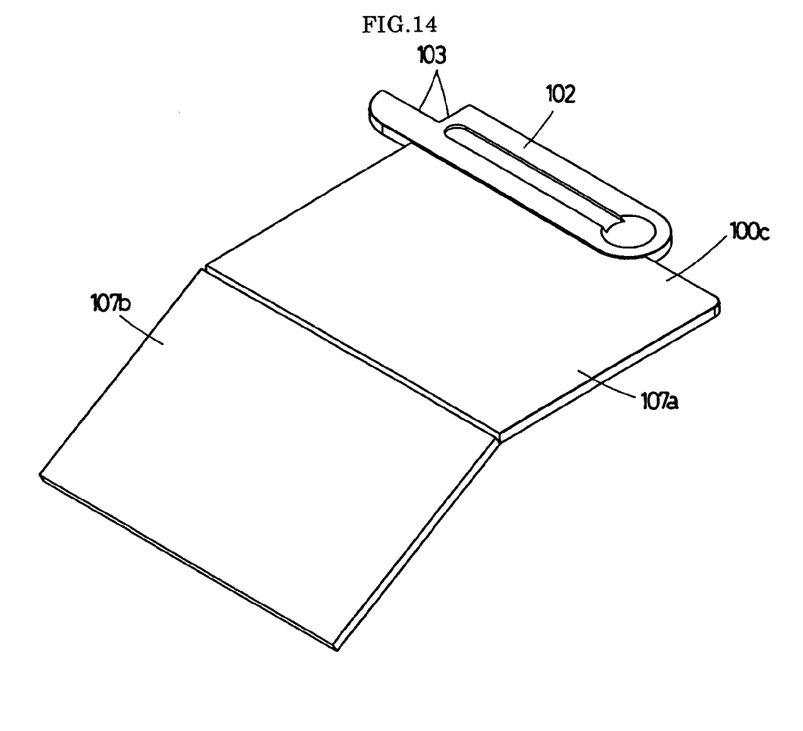
FIG. 14 is a perspective view of the stage.
Figure 15:
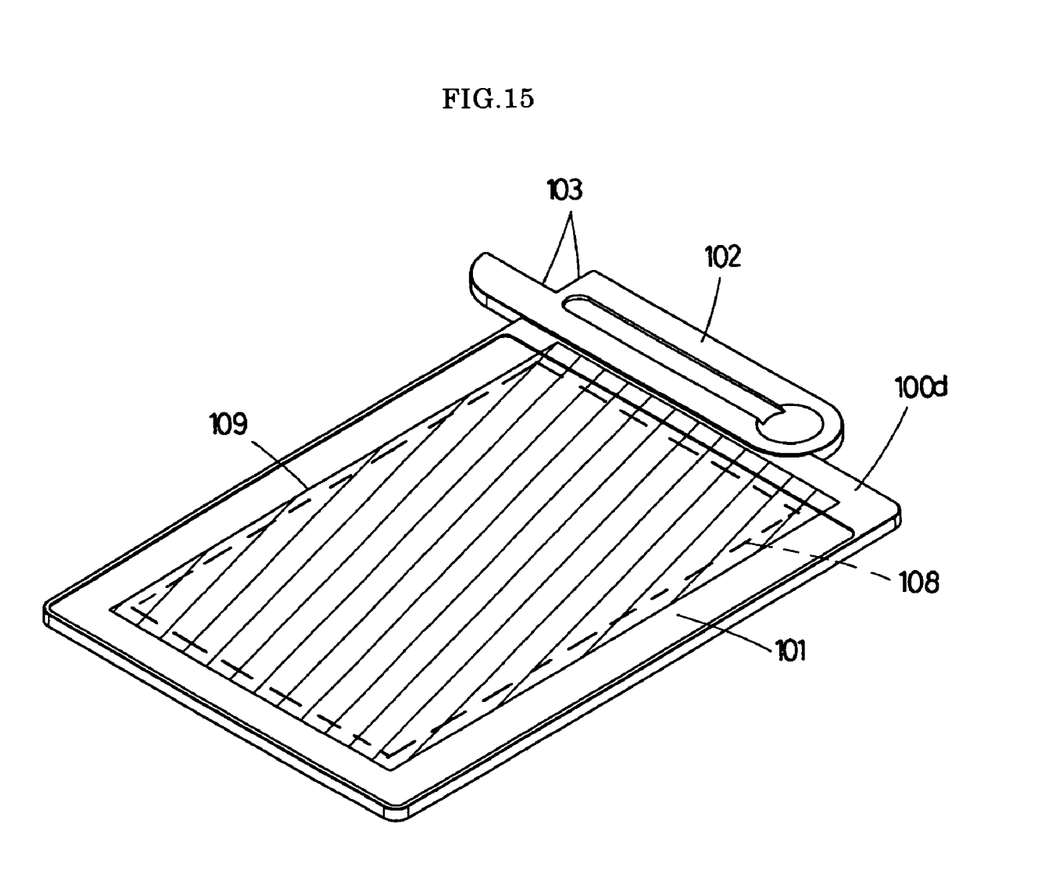
FIG. 15 is a perspective view of the stage.

The stage 100*a* as shown in FIG. 12 includes a whiteboard 105 serving as the placement surface 101. The stage 100*b* as shown in FIG. 13 has a backlight illumination 106 provided on the placement surface 101. The stage 100*c* as shown in FIG. 14 includes stage members 107*a* and 107*b* connected to each other by hinges (not shown). The stage 100*d* as shown in FIG. 15 is used in the case where a shine material 108 is to be presented. In this case, an attached antireflective sheet 109 is covered.

The coupling of the positioner 7 and the positioned member 102 may be executed by fitting of a protrusion of the dovetail tenon type in a dovetail groove which are coupled together in the relation of male and female. Furthermore, the positioned member 102 may be attachable to and detachable from each of the stages 100*a* to 100*d*, whereupon a single positioned member can commonly be used.

According to the above-described visual presenter 1, the pivot shaft unit 11 is subjected to both braking force of the wave washer 28 and biasing force of the return spring 37. Since both forces counteract the pivotal movement of the support column 13, the support column 13 can be stopped at any forward inclination, whereupon a free stop mechanism is provided. Furthermore, when returned from the forwardly-inclined position to the standing position, the support column 13 can easily be raised with the assist of the biasing force of the return spring 37. Additionally, since the counterweight 9 is enclosed in the base, when the support column 13 is forwardly inclined, the rear side of the visual presenter 1 is prevented from being raised without the user holding the base 3 of the visual presenter 1. Accordingly, one-hand operation of the support column 13 can be realized.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A visual presenter consisting of:
   a stage on which material is placed;
   a base which is discrete from the stage and is provided with a pivot shaft unit including a shaft support bracket;
   a support column mounted on the pivot shaft unit so as to be pivotable between a standing position and a forwardly-inclined position;
   a pivot shaft supported on the shaft support bracket;
   a single braking means consisting of a wave washer inserted through the pivot shaft to be tightened against the shaft support bracket by a nut in threading engagement with the pivot shaft, whereby a braking force is applied to the pivot shaft by tightening said nut; and
   a single return spring attached to pivot shaft and provided between said shaft support bracket and support column so as to apply a biasing force to the pivot shaft, the biasing force having a direction in which the support column is returned from the forwardly-inclined position to the standing position,
   wherein the braking force and the biasing force counteract a pivotal movement of the support column, and the base includes a counterweight disposed in the base so that the base is prevented from being moved during an operation of pivoting the support column.

2. The visual presenter according to claim wherein said pivot shaft unit includes hollow left and right members integrated together and said pivot shaft comprises a hollow shaft integrally formed on said left member extending through a hole in said shaft support bracket.

3. The visual presenter according to claim 2 wherein said left and right members are die cast aluminum.

\* \* \* \* \*